United States Patent
Timmerman et al.

(10) Patent No.: US 10,286,628 B2
(45) Date of Patent: May 14, 2019

(54) COMPOSITE FILM HAVING BARRIER PROPERTIES FOR USE AS IN-MOLD LABELS, ARTICLE WITH IN-MOLD LABELS, AND METHODS OF MAKING SAME

(71) Applicant: Taylor Communications, Inc., North Mankato, MN (US)

(72) Inventors: Lee A. Timmerman, Madison Lake, MN (US); Chad M. Ratcliff, Mankato, MN (US); Dennis W. Richmond, Loveland, OH (US); Lane H. Gravley, Mankato, MN (US)

(73) Assignee: Taylor Communications, Inc., North Mankato, MN (US)

( * ) Notice: Subject to any disclaimer, the term of this patent is extended or adjusted under 35 U.S.C. 154(b) by 0 days.

(21) Appl. No.: 13/834,035

(22) Filed: Mar. 15, 2013

(65) Prior Publication Data

US 2013/0302591 A1 Nov. 14, 2013

Related U.S. Application Data

(60) Provisional application No. 61/646,645, filed on May 14, 2012, provisional application No. 61/646,632, filed on May 14, 2012.

(51) Int. Cl.
  *B29L 9/00* (2006.01)
  *B32B 3/26* (2006.01)
  (Continued)

(52) U.S. Cl.
  CPC ........ *B32B 9/045* (2013.01); *B29C 45/14336* (2013.01); *B29C 45/14811* (2013.01);
  (Continued)

(58) Field of Classification Search
  CPC .......... B32B 27/32; B32B 27/08; B32B 3/26; B32B 2307/31; B32B 2307/518;
  (Continued)

(56) References Cited

U.S. PATENT DOCUMENTS 2,095,879 A 10/1937 Kittredge et al.
3,819,773 A 6/1974 Pears
(Continued)

FOREIGN PATENT DOCUMENTS

EP 2236264 A1 10/2010
JP 2005007647 1/2005
(Continued)

OTHER PUBLICATIONS

Translation of JP 09-094910, Asakura et al., Apr. 8, 1997, 7 pages.*
(Continued)

*Primary Examiner* — Hai Vo
(74) *Attorney, Agent, or Firm* — Patterson Thuente Pedersen, P.A.

(57) ABSTRACT

Barrier films, in-mold label formed from barrier films, and containers incorporating in-mold labels with barrier properties. Films according to embodiments of the invention include multi-layer or composite films that include one or more layers of a barrier material. The films can be used to form labels in standard in-mold labeling processes such that standard robotics, molds, and materials can be used. Preferably, the film can seal on itself such that an overlap seam can be made. The film has adequate desired barrier properties, i.e. water vapor, oxygen, light, aroma, and/or flavor retention barriers depending on the application, such as packaging of consumable products.

14 Claims, 6 Drawing Sheets

(51) Int. Cl.
  *B32B 9/04* (2006.01)
  *G09F 3/02* (2006.01)
  *B29C 45/14* (2006.01)
  *B32B 27/08* (2006.01)
  *B32B 27/32* (2006.01)

(52) U.S. Cl.
  CPC ............... *B32B 3/26* (2013.01); *B32B 27/08* (2013.01); *B32B 27/32* (2013.01); *G09F 3/02* (2013.01); *B29K 2995/0067* (2013.01); *B29K 2995/0069* (2013.01); *B29L 2009/003* (2013.01); *B32B 2255/10* (2013.01); *B32B 2255/205* (2013.01); *B32B 2307/41* (2013.01); *B32B 2307/518* (2013.01); *B32B 2307/7244* (2013.01); *B32B 2307/7246* (2013.01); *B32B 2307/75* (2013.01); *B32B 2519/00* (2013.01); *Y10T 428/249993* (2015.04); *Y10T 428/2848* (2015.01); *Y10T 428/2857* (2015.01); *Y10T 428/2883* (2015.01); *Y10T 428/31667* (2015.04); *Y10T 428/31938* (2015.04)

(58) Field of Classification Search
  CPC .... B32B 2307/7244; B32B 2307/7246; B32B 2307/75; B32B 2519/00; G09F 3/02; B29C 45/14811; B29C 45/14336; B29L 2009/003; B29K 2995/0067; B29K 2995/0069
  See application file for complete search history.

(56) References Cited

U.S. PATENT DOCUMENTS

| | | | |
|---|---|---|---|
| 4,022,943 A | 5/1977 | Erb et al. | |
| 4,486,483 A | 12/1984 | Caines | |
| 4,691,820 A | 9/1987 | Martinez | |
| 4,880,695 A | 11/1989 | Rudd et al. | |
| 4,897,533 A | 1/1990 | Lyszczarz | |
| 4,971,646 A | 11/1990 | Schell et al. | |
| 5,011,707 A | 4/1991 | Schell et al. | |
| 5,328,738 A | 7/1994 | McKillip et al. | |
| 5,466,535 A | 11/1995 | Higgins et al. | |
| 5,653,844 A | 8/1997 | Abrams | |
| 5,724,891 A | 3/1998 | Lovison | |
| 5,802,979 A | 9/1998 | Lovison | |
| 6,030,474 A | 2/2000 | Isono et al. | |
| 6,106,933 A * | 8/2000 | Nagai | B32B 27/32 428/212 |
| 6,471,128 B1 | 10/2002 | Corcoran et al. | |
| 6,491,782 B1 | 12/2002 | Jaynes | |
| 6,649,279 B2 * | 11/2003 | Migliorini et al. | 428/626 |
| 6,924,026 B2 | 8/2005 | Jaynes | |
| 7,153,555 B2 | 12/2006 | Raymond et al. | |
| 7,553,528 B1 | 6/2009 | Biddiscombe | |
| 2003/0108754 A1 | 6/2003 | Murschall et al. | |
| 2004/0081776 A1 | 4/2004 | Squier et al. | |
| 2005/0170161 A1 | 8/2005 | Ramchandra et al. | |
| 2006/0131306 A1 * | 6/2006 | Shinogi | 220/62.22 |
| 2007/0065610 A1 * | 3/2007 | Nomula | B32B 1/08 428/34.2 |
| 2008/0160327 A1 * | 7/2008 | Knoerzer | B32B 7/12 428/457 |
| 2009/0110888 A1 * | 4/2009 | Wuest et al. | 428/200 |
| 2009/0136693 A1 * | 5/2009 | Schmunkamp | 428/34.1 |
| 2009/0148674 A1 | 6/2009 | Sheu | |
| 2010/0227094 A1 | 9/2010 | Levesque et al. | |
| 2011/0132975 A1 | 6/2011 | Toft et al. | |
| 2011/0189397 A1 * | 8/2011 | Langstaff | B29C 45/14688 427/256 |
| 2011/0223362 A1 | 9/2011 | Van Loon et al. | |
| 2012/0207954 A1 * | 8/2012 | Dalpe | B65D 31/02 428/35.4 |
| 2012/0219790 A1 * | 8/2012 | Mount, III | B32B 27/36 428/336 |
| 2013/0344268 A1 | 12/2013 | Choi | |
| 2015/0084236 A1 * | 3/2015 | Timmerman | B32B 7/005 264/279 |

FOREIGN PATENT DOCUMENTS

| | | |
|---|---|---|
| JP | 2012018346 | 1/2012 |
| WO | WO 2012/018956 A2 | 2/2012 |

OTHER PUBLICATIONS

Search Report and Written Opinion dated Oct. 24, 2013 for PCT Application No. PCT/US2013/040761 filed May 13, 2013, 10 pages.
Spartech Corporation press release, Apr. 12, 2012, 2 pages.
PermaSafe® printout, at least as of May 8, 2012, 1 page.
"Seafood specialties in retorted, IML tubs", Packaging World, Nov. 2011, 1 page.

* cited by examiner

COMPOSITE FILM HAVING BARRIER PROPERTIES FOR USE AS IN-MOLD LABELS, ARTICLE WITH IN-MOLD LABELS, AND METHODS OF MAKING SAME

RELATED APPLICATIONS

The present application claims the benefit of U.S. Provisional Application Nos. 61/646,632 and 61/646,645, both filed May 14, 2012, and both of which are incorporated herein in their entireties by reference.

TECHNICAL FIELD

The invention relates generally to in-mold label technology, and more specifically to a composite film having barrier properties for use in in-mold label technologies, and molded containers incorporating such film.

BACKGROUND

In-mold labeling (IML) is the use of paper or plastic labels during the manufacturing of containers or other articles by blow molding, injection molding, or thermoforming processes. The label or insert serves as the integral part of the final product, which is then delivered as pre-decorated item.

IML is primarily used today for decorating injection molded parts for consumer electronics and for plastic cups and bottles. Manufacturers are adopting IML technology for greater wear resistance than traditional printing of molded articles, and for better adhesion to the underlying molded article or container. This is because a film, such as a transparent polymeric film, is printed on one side with decorative ink. The printed film is converted into a label, which is then positioned on a mold wall of an injection molding die or tool. Injection plastic, in the form of a heated or molten plastic shot, is introduced into the mold in contact with one side of the film, either the ink side (with protective layers therebetween) or the non-ink side. When the plastic shot material is introduced such that it is proximate the ink side of the label, this fuses to a non-printed surface of the label, and encapsulates the decoration between the film layer of the label and the injected plastic resulting in a decoration that cannot be abraded during use.

Further, IML can provide greater decorating options than other methods. For example, multi-color offset lithography printed graphics or digital graphics are used to produce products with higher quality graphics than available with other decorating methods.

During the molding process, robotics can be used to sense and position a label in the mold tool, such as a steel mold. Vacuum and compressed air can be used to hold the label in place during the molding process. Alternatively, static electricity can be used. In the case of static, electrostatic charging electrodes shot a label while it is being transferred to the molding machine, so that when the label is placed on the tool and released by the labeling robot, it will wrap itself onto or into the tool, and remain on the tool until the article is molded and cooled.

The in-mold labels can be formed from paper or a similar material to the plastic shot material. For example, polypropylene or polystyrene is commonly used as label material, with a thickness of ranging from about 15 to 100 micrometers; however the thickness of the label can be thinner or thicker than the exemplary, non-limiting range, depending on the final application or desired molded product. For example, for handling and structural integrity of a molded container, a label thickness in excess of 100 micrometers may be desired. For applications for molded products that are instead lightweight, have complex shapes such that conformity to shape is desired, do not require excessive structural integrity, and/or for the purpose of keeping manufacturing and shipping costs down, labels less than 15 micrometers in thickness can be contemplated.

Cavitated materials can also be used. Cavitated materials are sandwich or layered materials, having a spongy layer bonded between two or more very thin solid, or functional layers. An advantage of cavitated film is better conformance to small-radius curves on a product. Laminated films can also be used, with or without cavitated materials, to decorate products, yielding high wear-resistance. This type of film can have the printed surface protected by a second layer of film, such that the label has a total thickness of about 15 or 40 micrometers; however, as described above the thickness of the label can be thinner or thicker than the exemplary, non-limiting range, depending on the final application or desired molded product.

The standard films used in in-mold labeling are inherently good or excellent water vapor barriers. However, they are not oxygen barriers, which can be desired for packaging of certain consumable products. The following table is an example of typical oxygen, carbon dioxide, and moisture or water vapor transition rates of common types of films used in packaging, wherein MVTR stands for Moisture Vapor Transmission Rate in g-mil/100 in.$^2$/24 hr, and O2 and CO2 stand for Oxygen Transmission Rate (OTR) and Carbon Dioxide Transmission Rate (COTR), respectively, in cm$^3$-mil/m$^2$/24 hr.

| Material | MVTR | O2TR | CO2TR |
| --- | --- | --- | --- |
| PET (Oriented or Stretch Blown Polyethylene Terephthalate) | 2.0 | 75 | 540 |
| HDPE (High Density Polyethylene) | 0.5 | 4,000 | 18,000 |
| PVC (Polyvinyl Chloride) | 3.0 | 150 | 380 |
| PP (Polypropylene) | 0.5 | 3,500 | 7,000 |
| PS (Polystyrene) | 10.0 | 6,000 | 18,700 |
| PLA (Polylactide - Oriented/Stretch Blown bottles) | 18-22 | 38-42 | 201 |

One non-limiting example of desired barrier properties for packaging of consumable products include a Water Vapor Transmission Rate (WVTR) of 0.010 g/100 in$^2$/day at 84.4° F./80% RH and an Oxygen Transmission Rate (O2TR) of 0.0041 cc/100 in$^2$/day at 73° F./0% RH. Other barrier properties, in addition to or alternatively to water vapor and oxygen, can also be desired depending on the product being molded and its final use or application. Such properties can include, but are not limited to, light (e.g. UV), aroma, and/or flavor retention. The desired barrier properties of the final molded product are application specific and depends on, for example, the product being contained within the molded article, the perceived shelf life of the product, the sensitivity of the product to environmental factors, and/or the different spoilage or failure mechanisms that define when the product has "expired" or "gone bad." Because existing in-mold technologies do not offer many of the desired barrier properties for consumable product, applications of the existing in-mold technologies is therefore limited to containers such as cups or other decorative articles, and are not used for packaging consumable products or products with a shelf life, including, but not limited to, liquid and solid foods, medications, toiletries such as perfumes and toothpaste, beverages, paints, adhesives, or the like.

Films with both water vapor and oxygen barrier properties are commonly used in the pouching industry for packaging of foods such as fatty foods, sauces and liquids, medical devices or instruments, medicines, and the like. These films are typically multi-layer or composite films that include a barrier film and are specifically constructed based on the intended use of the pouch. These barrier films can include, for example, coextruded, peelable heat-seal films and silicon oxide/aluminum oxide composites, or metallic films or films having a vacuum-deposited layer of metallic material such as aluminum oxide ($Al_2O_3$) or silicon oxide ($SiO_x$). Some of these can withstand retort or other sterilization (e.g. autoclave) processes that can reach temperatures in excess of 270 degrees Fahrenheit for extended periods of time (e.g. 70 minutes or more) depending on the contents of the pouch and the sterilization needs.

The films used in the pouching industry, however, do not necessarily translate into the in-mold labeling industry. To create an adequate seal, an in-mold label is preferably overlapped and sealed onto itself in the molding process to ensure a complete seal. However, these thin solid films cannot seal to themselves in injection-molded processes. These film are also oftentimes too thin to be efficiently use in injection molding processes because they are difficult to place and maintain within a mold. Furthermore, these films are sometimes not compatible with the plastic shot materials of the molding process such that the label does not adhere well to the underlying molded article and can peel away from the article, therefore breaching the seal or barrier.

In-mold labels having barrier properties have been recently developed. One example of an in-mold label having barrier properties is a composite film that includes a layer of ethyl vinyl alcohol encapsulated or sandwiched between two polymeric layers, such as cast polypropylene, that readily adheres to the underlying shot material to such that the label does not peel away. However, these labels are expensive due to the amount of material needed to create adequate barrier properties. Furthermore, downgauging of these materials is difficult for applications in which conformity to a complex shape is desired. Downgauging refers to reducing the amount of material in a product while still maintaining or even improving the properties of that material. When these films are downgauged, the barrier properties are often compromised and/or eliminated.

These labels also are not able to seal upon themselves such that an overlap cannot be created. Rather, a precise butt splice must be created such that the label meets exactly end to end without breach of the barrier. This requires expensive precision cutting equipment, robotic placement systems, and can generate large volumes of waste if the label is neither cut precisely nor placed correctly into the mold.

Finally, these films, although adequate for dry barrier applications such as dry foods, cannot withstand retort or sterilization processes as described above, or other processes performed at high temperatures and/or pressures for extended periods of time, thereby compromising the barrier properties of the film.

There remains a need for a film for use in in-mold labeling technologies that offers adequate barrier properties, such as water vapor and oxygen barriers, and that can withstand molding processes, retort or other sterilization or pasteurization processes, and other such intense processes without compromising the barrier properties. Preferably, the film is similarly in cost to standard in-mold labels.

SUMMARY OF THE INVENTION

Films according to embodiments of the invention include multi-layer or composite films that include one or more layers of a barrier material. The films can be used to form labels in standard in-mold labeling processes such that standard robotics, molds, and materials can be used. Preferably, the film can seal on itself such that an overlap seam can be made. The film has adequate desired barrier properties, i.e. water vapor, oxygen, light, aroma, and/or flavor retention barriers depending on the application, such that it can be used for packaging of any of a variety of consumable products including, but not limited to, wet or dry foods, beverages, cosmetics, aromas such as perfumes, toiletries such as hair care, toothpastes, lotions, medical uses such as devices or medicines or ointments, paints, or adhesives. Finally, the films are able to withstand extreme processing conditions without compromising the barrier properties of the film. Such conditions can be high temperatures and/or pressures for extended periods of time as a result of retort processing, other sterilization processes such as autoclaving, microwaving, dishwashing, or low temperatures due to freezing or refrigeration.

In one embodiment of the invention, a barrier film is or is laminated to a base film or substrate compatible with in-mold processes, i.e. can be readily placed and retained within the mold, and adequately adheres to a plastic shot material. The barrier film can comprise a transparent, opaque, or metalized film, such as a film having a barrier or metalized layer thereon. The base film or substrate can comprise standard and/or cavitated films depending on the application or the article to be molded. In some embodiments, the barrier film is encased between substrates that are compatible with the molding process, such that an overlap seal is formed.

The composite films are converted into in-mold labels, and used to fabricate articles having barrier properties, such as water vapor barrier properties, oxygen barrier properties, light barrier properties, aroma barrier properties, and/or flavor barrier properties. For example, molded articles incorporating the in-mold labels having barrier properties according to embodiments of the invention are application specific, i.e. the barrier properties, and therefore films are selected depending on the desired properties for packaging of a particular product. The barrier properties of the films and containers of the present invention can be individually tailored according to the industry or customer need for a particular packaging application.

The in-mold labels according to embodiments of the invention combine barrier properties of consumable product packaging with readily moldable substrates to form molded articles having barrier properties. The in-mold labels can also withstand extreme processing conditions associated with molding, sterilization processes such as retort processing, and the like. The final molded articles can be used for the packaging of consumable products and offer any of a variety of shapes and dimensions, graphics, and may be recyclable depending on the final construction of the film and article, thereby yielding unlimited applications.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The embodiments of the present invention may be more completely understood in consideration of the following detailed description of various embodiments in connection with the accompanying drawings, in which.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

Barrier film constructions for use as labels in standard in-mold processes according to embodiments of the invention offer adequate barrier properties and sealing properties such that articles made with such labels can be used for consumable products and may eliminate the need for separate seals or protective layers. Furthermore, articles or containers made with such labels may withstand extreme processing conditions such as those associated with molding of the article by blow molding or injection molding, sterilization processing including retort processing, and autoclaving, cleaning such as dishwasher, freezing, refrigeration, and microwaving, without compromising the barrier properties or structural integrity of the container. Because of the enhanced properties provided to the container by the composite film used as an in-mold label, the containers can be created for any of a variety of packaging applications including wet or dry food products, fatty food products, beverages such as carbonated beverages, hair care products such as hair spray, shampoos, and conditioners, aromatic products such as perfumes and sprays, personal care products such as toothpastes, cosmetics, lotions, tonics, and creams, medical products such as ointments, medicines, and certain medical devices, and industrial products such as paints and adhesives.

The articles or containers made with the in-mold labels according to embodiments of the invention offer advantages over the currently available packaging such as tin or aluminum cans and glass jars. Such advantages can include the increased flexibility in container shape because a container can be molded into virtually any shape. This allows for the container to become an identifier itself thereby creating potential tradedress protections. The containers according to embodiments of the invention may also recyclable when manufactured with materials having established recycling streams, such as polypropylene or polyethylene. The containers according to embodiments of the invention are also lighter in weight than traditional cans and jars such that they are more economical to ship. Furthermore, the containers can be shaped to maximize nesting or packing fraction such that less space in transport, storage, and display shelving is needed. The nature of the in-mold label allows for increased graphics quality and options due to the increased printing options on a film web as compared to printing directly on the container itself, and offers increased billboard space because as the decoration or print can flow with the container shape, and graphics coverage is unlimited such that a container can have up to 100% coverage. In addition, the composite films can include a lens sheet, such as a lenticular or fly's eye lens sheet, for enhanced or eye-catching graphics including depth, 3D graphics, motion, morph, and/or flip features.

Figure 1:
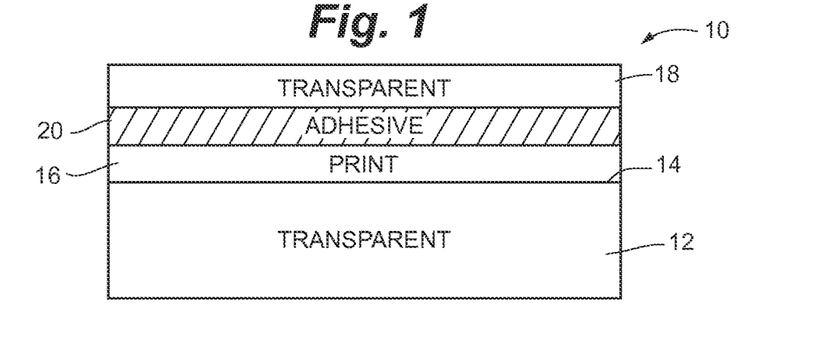
FIG. 1 is a cross-sectional view of a transparent barrier film construction according to one embodiment of the invention for standard in-mold label applications.

Referring to FIG. 1, a composite film for use in in-mold labels comprises a transparent composite film 10. Film 10 can include a base layer 12 coupled to a barrier layer 18. Base layer 12 comprises a transparent film material suitable for in-mold processing conditions such that it adheres readily to a plastic shot material used for molding of an article. Base layer 12 can comprise, for example, a transparent polypropylene or polyethylene film. Base layer 12 has a thickness from about 20 to about 75 μm and more particularly from about 40 to about 65 μm; however, as described above the thickness of the label can be thinner or thicker than the exemplary, non-limiting range, depending on the final application or desired molded product.

An inner side 14 of base layer 12 can optionally be printed forming one or more print layers 16 with indicia or printed matter including, but not limited to, alphanumeric characters, graphics, text, product information, flood coatings, or combinations thereof. Print layer 16 can be formed from any of a number of suitable printing techniques such as, for example, flexographic, lithographic, gravure, rotogravure, digital inkjet, digital toner, screen printing, and the like and combinations thereof. Print layer 16 can be printed using traditional and non-traditional inkjet ink, dry offset ink, litho ink, flexo ink, silk screen ink, latex ink, inks using cationic additives such as those used in the rotogravure industry, and the like in one of the aforementioned printing techniques or combination of techniques. The inkjet ink used may be a traditional solvent- or UV-based ink. In one embodiment, UV curable inks can be used, such as SUNCURE inks commercially available from Sun Chemical of Carlstadt, N.J., and UV curable inks commercially available from Flint Inks of St. Paul, Minn. Other suitable printing materials or media can include toners, water- or solvent-based inks, solventless inks, other forms of radiation curable inks, and combinations thereof.

Barrier layer 18 is coupled to base layer 12, sandwiching optional print layer 16 therebetween. Barrier layer 18 comprises a transparent barrier film such that print layer 16 is readable through barrier layer 18. Suitable barrier films can include, for example, a chlorine-free, transparent, high oxygen and high water vapor barrier, such as a biaxially oriented polypropylene film with a sealant layer on one side. One such barrier film is available from AET Films. Barrier film 12 has a thickness from about 5 to about 40 μm, and more particularly from about 20 to about 30 μm. However, as described above the thickness of the label can be thinner or thicker than the exemplary, non-limiting range, depending on the final application or desired molded product.

In one embodiment of the invention, barrier layer 18 is coupled to base layer 12 via an adhesive layer 20 that covers at least a portion of print layer 16. Adhesive layer 20 can comprise any of a number of suitable adhesives, such as a two-part solventless adhesive including MOR—FREE™ solventless lamination adhesive systems available from The Dow Chemical Company, and Purelam™ aromatic solventless laminating adhesive available from Ashland. Adhesive layer 20 should be of sufficient strength such that barrier layer 18 does not separate from base layer 12 during molding, or subsequent processing.

Optionally, an outer surface of barrier layer 18 can be printed forming one or more print layers in addition to or alternatively to print layers 16 as described above with respect to print layer 16.

When placed in a mold, barrier layer 18 faces outwardly, while base layer 12 is the inner-most layer in contact with the molten plastic shot material. The plastic shot bonds directly to base layer 12.

Figure 2:
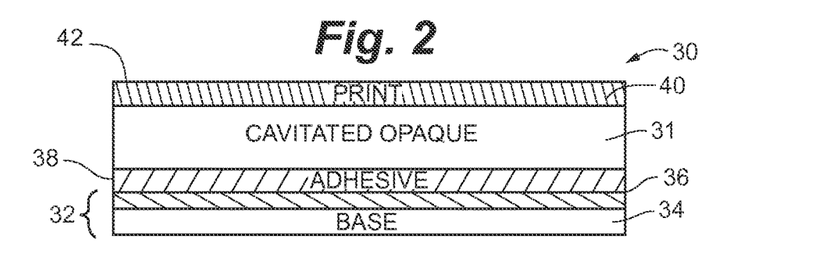
FIG. 2 is a cross-sectional view of an opaque barrier film construction according to another embodiment of the invention for standard in-mold label applications.

Referring to FIG. 2, in an alternative embodiment of the invention, a composite film 30 can comprise a base layer 31, and a barrier film 32 coupled to base layer 31. Base layer 31 comprises a cavitated opaque film material suitable for in-mold processing conditions such that it adheres readily to a plastic shot material used for molding of an article. For example, the cavitated film can include multiple layers including one or more spongy layers, such as highly voided oriented polypropylene (OPP), optionally sandwiched between other OPP layers, and/or one or more functional or printable layers covering the spongy layers. Suitable cavitated films according to embodiments include cavitated films, with or without functional layers, available from Treofan available at various gauges including, but not limited to, 50, 57, 60, 70, 75, 100, and 120 μm.

In this non-limiting embodiment, base layer 31 has a thickness from about 20 to about 75 μm and more particularly from about 45 to about 65 μm, and more particularly about 57 μm; however, as described above the thickness of the label can be thinner or thicker than the exemplary, non-limiting range, depending on the final application or desired molded product Barrier film 32 includes a substrate layer 34 and a metalized layer 36 deposited on a surface of substrate layer 34. One such metalized barrier film is available from AET Films, such as described in Table 1 below, Film 6. Substrate layer 34 can comprise a transparent or opaque film material, such as polypropylene or polyethylene, suitable for in-mold processing conditions such that it adheres readily to a plastic shot material used for molding of an article. Substrate layer 34 has a thickness from about 5 to about 40 μm, and more particularly from about 15 to about 25 μm. However, as described above the thickness of the label can be thinner or thicker than the exemplary, non-limiting range, depending on the final application or desired molded product.

Metalized layer 36 can comprise, for example, a thin film (less than 5 μm) of vacuum-deposited metallic material such as aluminum oxide (alumina) or silicon oxide (silica). In one embodiment of the invention, metalized layer 36 comprises alumina doped with oxygen such that metallic layer 36 is transparent or translucent. Furthermore, alumina is an electric insulator. This is important in in-mold applications because when static is used to hold the in-mold label in place during the molding process. A conductive metalized layer will create an undesired electric arc in the static hold in the mold, which can thereby shut down or have other detrimental effects on the electric power to the static hold. The label is then free to move around or fall out of the mold during molding, which results in a defective article. Examples of non-conductive metalized films can be found in U.S. Patent Application Publication No. 2011/0223362, entitled "Metalized In Mold Label and Molded Articles Having Same," incorporated herein by reference in its entirety.

Alternatively, if metalized layer 36 comprises an electrically conductive material, a label made from composite film 30 is sufficiently overlapped on itself such that the metalized layer 36 is completely encapsulated within the label such that no arc in the static hold is created. Alternatively, a vacuum hold can be employed in place of a static hold.

Base layer 31 is coupled to barrier film 32 via an adhesive layer 38. Adhesive layer 38 can comprise any of a number of suitable adhesives as described above with respect to FIG. 1.

An outer surface 40 of base layer 31 can optionally be printed forming one or more print layers 42 as described above with respect to print layer 16 of FIG. 1.

When placed in a mold, substrate layer 34 of barrier film 32 faces inwardly such that it is the inner-most layer in contact with the molten plastic shot material, while outer surface 40 of base layer 31 with optional print layer(s) 42 faces outwardly. The plastic shot bonds directly to substrate layer 34 of barrier film 32.

Figure 3:
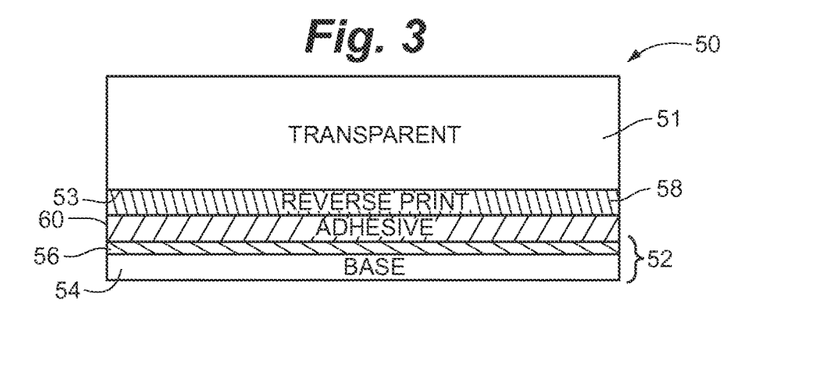
FIG. 3 is a cross-sectional view of a barrier film construction having a metallic appearance according to another embodiment of the invention for standard in-mold label applications.

In an alternative embodiment to FIG. 2, and referring to FIG. 3, a composite film 50 comprises a base layer 51, and a barrier film 52 coupled to base layer 51. Base layer 51 instead comprises a transparent film material suitable for in-mold processing conditions such that it adheres readily to a plastic shot material used for molding of an article, as described with respect to base layer 12 of FIG. 1. Base layer 51 has a thickness from about 20 to about 75 μm and more particularly from about 40 to about 65 μm. However, as described above the thickness of the label can be thinner or thicker than the exemplary, non-limiting range, depending on the final application or desired molded product.

An inner side 53 of base layer 51 can optionally be printed forming one or more print layers 58 as described above with respect to print layer 16 of FIG. 1. Base layer 51 can be of sufficient transparency such that print layer(s) 58 are visible through base layer 51.

Barrier film 52 includes a substrate layer 54 and a metalized layer 56 deposited on a surface of substrate layer 54, as described with respect to barrier film 32 of FIG. 2. In one embodiment of the invention, metalized layer 56 is not doped such that it is opaque and instead exhibits a metallic decorative appearance visible through base layer 51. In one embodiment, print layer(s) 58 are reverse print such that metalized layer 56 is viewable therethrough as the foreground.

Base layer 51 is coupled to barrier film 52 via an adhesive layer 60. Adhesive layer 60 can comprise any of a number of suitable adhesives as described above with respect to FIG. 1.

Optionally, an outer surface of base layer 51 can be printed forming one or more print layers in addition to or alternatively to print layer(s) 58, as described above with respect to print layer 16 of FIG. 1.

When placed in a mold, substrate layer 54 of barrier film 52 faces inwardly such that it is the inner-most layer in contact with the molten plastic shot material, while an outer surface 62 of base layer 51 faces outwardly. The plastic shot bonds directly to substrate layer 54 of barrier film 52.

Figure 4:
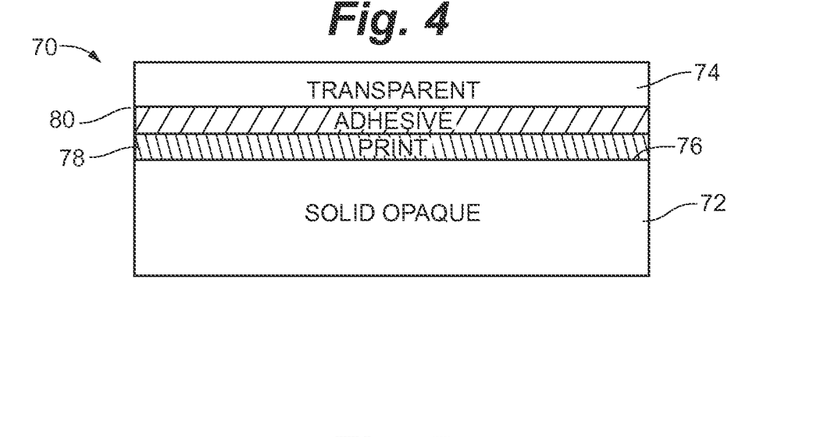
FIG. 4 is a cross-sectional view of an opaque barrier film construction according to another embodiment of the invention for standard in-mold label applications.

In yet another alternative embodiment of the invention, and referring to FIG. 4, a composite film 70 comprises a base layer 72, and a barrier layer 74 coupled to base layer 72. Base layer 72 comprises a solid opaque film material, and optionally a cavitated material, suitable for in-mold processing conditions such that it adheres readily to a plastic shot material used for molding of an article, as described with respect to base layer 12 of FIG. 1. Base layer 72 has a thickness from about 20 to about 75 µm and more particularly from about 40 to about 65 µm. However, as described above the thickness of the label can be thinner or thicker than the exemplary, non-limiting range, depending on the final application or desired molded product.

An inner side 76 of base layer 72 can optionally be printed forming one or more print layers 78 as described above with respect to print layer 16 of FIG. 1.

Barrier layer 74 is coupled to base layer 12, sandwiching optional print layer 78 therebetween. Barrier layer 74 comprises a transparent barrier film such that print layer 78 is readable through barrier layer 74, such as barrier layer 18 described with respect to FIG. 1. Barrier layer 74 has a thickness from about 5 to about 40 µm, and more particularly from about 20 to about 30 µm. However, as described above the thickness of the label can be thinner or thicker than the exemplary, non-limiting range, depending on the final application or desired molded product.

Base layer 72 is coupled to barrier layer 74 via an adhesive layer 80. Adhesive layer 80 can comprise any of a number of suitable adhesives as described above with respect to FIG. 1.

When placed in a mold, barrier layer 74 faces outwardly, while base layer 72 is the inner-most layer in contact with the molten plastic shot material. The plastic shot bonds directly to base layer 72.

Figure 5:
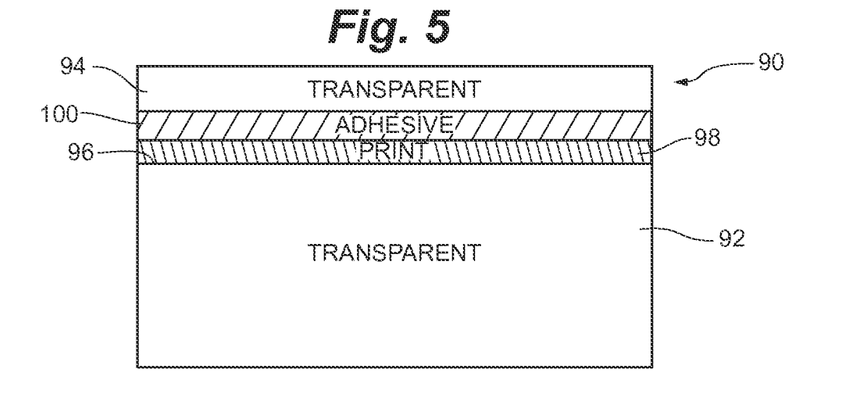
FIG. 5 is a cross-sectional view of a transparent barrier film construction according to one embodiment of the invention for seal and peel in-mold label applications.

Referring to FIG. 5, an in-mold label for a peel and seal application is made from a composite film 90 including a base layer 92 and a barrier layer 94. Base layer 92 comprises a transparent film material suitable for in-mold processing conditions such that it adheres readily to a plastic shot material used for molding of an article, as described with respect to base layer 12 of FIG. 1. Base layer 92 has a thickness from about 20 to about 120 µm and more particularly from about 90 to about 110 µm. However, as described above the thickness of the label can be thinner or thicker than the exemplary, non-limiting range, depending on the final application or desired molded product. Suitable materials for base layer 92 can include, but are not limited to, lidding materials supplied by KWH Plast, Etimex or American Profol Inc.

An inner side 96 of base layer 92 can optionally be printed forming one or more print layers 98 as described above with respect to print layer 16 of FIG. 1.

Barrier layer 94 is coupled to base layer 92, sandwiching optional print layer 98 therebetween. Barrier layer 94 comprises a transparent barrier film such that print layer 98 is readable through barrier layer 94, such as barrier layer 18 described with respect to FIG. 1. Barrier layer 94 has a thickness from about 5 to about 40 µm, and more particularly from about 20 to about 30 µm. However, as described above the thickness of the label can be thinner or thicker than the exemplary, non-limiting range, depending on the final application or desired molded product.

Base layer 92 is coupled to barrier layer 94 via an adhesive layer 100. Adhesive layer 100 can comprise any of a number of suitable adhesives as described above with respect to FIG. 1.

Optionally, an outer surface of barrier layer 94 can be printed forming one or more print layers in addition to or alternatively to print layer(s) 98, as described above with respect to print layer 16 of FIG. 1.

When placed in a mold, barrier layer 94 faces outwardly, while base layer 92 is the inner-most layer in contact with the molten plastic shot material. The plastic shot bonds directly to base layer 92.

Figure 6:
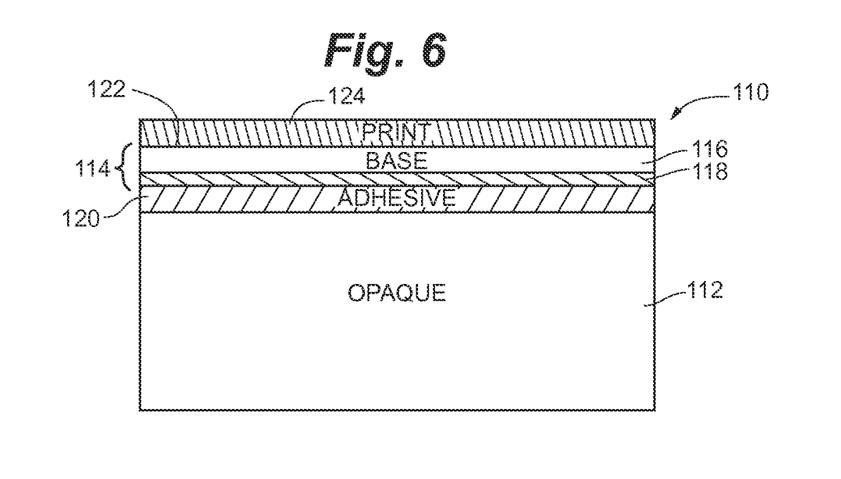
FIG. 6 is a cross-sectional view of an opaque barrier film construction according to another embodiment of the invention for seal and peel in-mold label applications.

In an alternative embodiment of the invention, referring to FIG. 6, in-mold label for a peel and seal application is made from a composite film 110 including a base layer 112 and a barrier film 114. Base layer 112 comprises an opaque film material suitable for in-mold processing conditions such that it adheres readily to a plastic shot material used for molding of an article, as described with respect to base layer 12 of FIG. 1. Base layer 112 has a thickness from about 20 to about 120 µm and more particularly from about 90 to about 110 µm. However, as described above the thickness of the label can be thinner or thicker than the exemplary, non-limiting range, depending on the final application or desired molded product. Suitable materials for base layer 112 can include lidding materials supplied by KWH Plast, Etimex or American Profol Inc.

Barrier film 114 includes a substrate layer 116 and a metalized layer 118 deposited on a surface of substrate layer 116, as described with respect to barrier film 32 of FIG. 2. Barrier film 114 has a thickness from about 5 to about 40 µm, and more particularly from about 20 to about 30 µm.

Base layer 112 is coupled to barrier film 114 via an adhesive layer 120 such that metalized layer 118 is sandwiched in between base layer 112 and substrate layer 116. Adhesive layer 120 can comprise any of a number of suitable adhesives as described above with respect to FIG. 1.

An outer surface 122 of substrate layer 116 of barrier film 114 can optionally be printed forming one or more print layers 124 as described above with respect to print layer 16 of FIG. 1.

When placed in a mold, outer surface 122 of substrate layer 34 of barrier film 32 with optional print layer(s) 42 faces outwardly, while base layer 112 faces inwardly such that it is the inner-most layer in contact with the molten plastic shot material. The plastic shot bonds directly to base layer 112.

Figure 7:
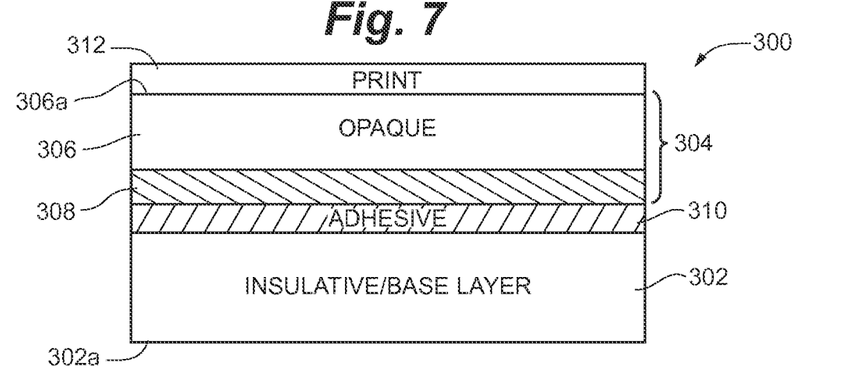
FIG. 7 is a cross-sectional view of an opaque barrier film construction including a metallic layer according to another embodiment of the invention for standard in-mold label applications.

Referring to FIG. 7, in an alternative embodiment of the invention, a composite film 300 for use as standard in-mold labels can comprise a base layer 302, and a barrier film 304 coupled to base layer 302. Base layer 302 comprises a cavitated, opaque film material, such as oriented polypropylene films available from Treofan (described with respect of FIG. 1), suitable for in-mold processing conditions such that it adheres readily to a plastic shot material used for molding of an article. For example, the cavitated film can include multiple layers including one or more spongy layers and one or more functional or printable layers covering the spongy layers. Base layer 302 has a thickness from about 20 to about 75 µm and more particularly from about 45 to about 55 µm, and even more particularly about 50 µm; however, as described above the thickness of the label can be thinner or thicker than the exemplary, non-limiting range, depending on the final application or desired molded product Barrier film 304 includes a substrate layer 306 and a metalized layer 308 deposited, such as by vapor deposition, on a surface of substrate layer 306. One such metalized barrier film is available from AET Films, as described at Film 6 of Table 1 below. Substrate layer 306 can comprise a transparent or opaque film material, such as polypropylene or polyethylene, suitable for in-mold processing conditions such that it adheres readily to a plastic shot material used for molding of an article. Substrate layer 306 has a thickness from about 5 to about 40 µm, and more particularly from about 15 to about 25 µm, and even more particularly about 19 µm. However, as described above the thickness of the label can be thinner or thicker than the exemplary, non-limiting range, depending on the final application or desired molded product.

Metalized layer 308 can comprise, for example, a thin film (less than 5 µm) of vacuum-deposited metallic material such as aluminum oxide (alumina) or silicon oxide (silica), as described above with respect of FIG. 2, for example. In one embodiment of the invention, metalized layer 308 comprises alumina doped with oxygen such that metalized layer 308 is transparent or translucent.

Metalized layer 308 can be non-conductive, for example, when formed of alumina or silica. Alternatively, if metalized layer 308 comprises an electrically conductive material, a label made from composite film 300 is sufficiently overlapped on itself such that the metalized layer 308 is completely encapsulated within the label such that no arc in the static hold is created. Alternatively, a vacuum hold can be employed in place of a static hold.

Base layer 302 is coupled to barrier film 304 via an adhesive layer 310, as describe above. Base layer 302 is coupled to barrier film 304 such that adhesive layer 310 is sandwiched between base layer 302 and metallic layer 308.

An outer surface 306a of substrate layer 306 can optionally be printed forming one or more print layers 312 as described above with respect to print layer 16 of FIG. 1.

When placed in a mold, an outer surface 302a of base layer 302 faces inwardly such that it is the inner-most layer in contact with the molten plastic shot material, while outer surface 306a of substrate layer 306 with optional print layer(s) 312 faces outwardly. The plastic shot bonds directly to base layer 302 during molding. In this embodiment, base layer 302 is of sufficient thickness to provide insulative properties to barrier layer 304 and print layer(s) 312 during molding such that the barrier properties of barrier layer 304 are not significantly compromised.

Furthermore, the construction of film 300 allows for sufficient overlap and sealing upon itself.

Figure 8:
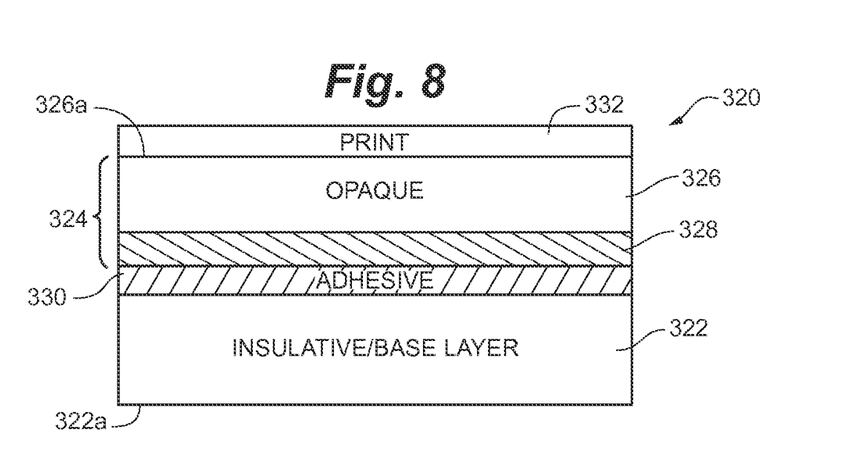
FIG. 8 is a cross-sectional view of an opaque barrier film construction including a metallic layer according to another embodiment of the invention for standard in-mold label applications.

Referring to FIG. 8, a composite film 320 for use as standard in-mold labels is similar in construction to film 300 of FIG. 7, and includes base layer 322, of similar material and thicknesses of base layer 302 married to a barrier layer 324. Barrier layer 324 includes a substrate layer 326 and a metalized layer 328. Barrier layer 324 is similar in construction and thickness to barrier layer 304.

Base layer 322 is coupled to barrier film 324 via an adhesive layer 330, as describe above. Base layer 322 is coupled to barrier film 324 such that adhesive layer 330 is sandwiched between base layer 322 and metallic layer 328.

An outer surface 326a of substrate layer 326 can optionally be printed forming one or more print layers 332 as described above with respect to print layer 16 of FIG. 1.

When placed in a mold, an outer surface 322a of base layer 322 faces inwardly such that it is the inner-most layer in contact with the molten plastic shot material, while outer surface 326a of substrate layer 326 with optional print layer(s) 332 faces outwardly. The plastic shot bonds directly to base layer 322 during molding. In this embodiment, base layer 322 is of sufficient thickness to provide insulative properties to barrier layer 324 and print layer(s) 332 during molding such that the barrier properties of barrier layer 324 are not significantly compromised.

Furthermore, the construction of film 320 allows for sufficient overlap and sealing upon itself.

Figure 9:
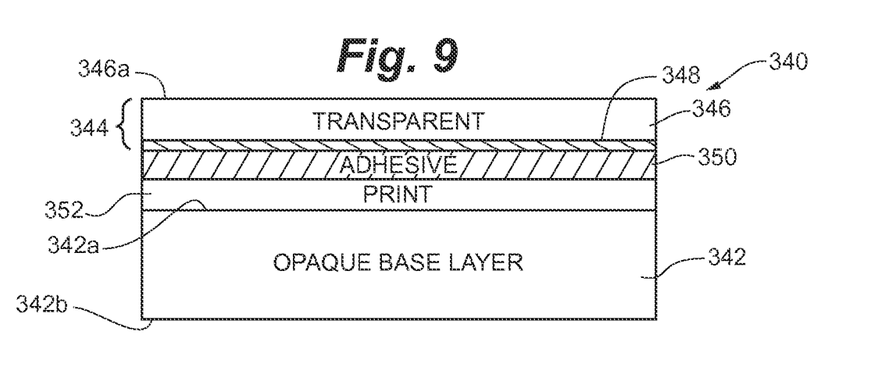
FIG. 9 is a cross-sectional view of an opaque barrier film construction including a silicon oxide ($SiO_x$) layer according to another embodiment of the invention for standard in-mold label applications.

Referring to FIG. 9, a composite film 340 for use as standard in-mold labels comprises a base layer 342, of similar material and thicknesses of base layer 302, married to a barrier layer 344. Barrier film 344 includes a transparent substrate layer 346 and a metalized layer 348 deposited, such as by vapor deposition, on a surface of substrate layer 346. One such metalized barrier film comprises a transparent film of a polymeric material, such as, for example, polyethylene, PET or polypropylene including biaxially oriented polypropylene (BOPP), having a layer of silicon oxide ($SiO_x$), such as silicon dioxide, deposited thereon. Substrate layer 346 has a thickness from about 5 to about 40 µm, and more particularly from about 15 to about 25 µm. However, as described above the thickness of the label can be thinner or thicker than the exemplary, non-limiting range, depending on the final application or desired molded product.

Base layer 342 is coupled to barrier film 344 via an adhesive layer 350, as described above. Base layer 342 is coupled to barrier film 344 such that adhesive layer 340 is sandwiched between base layer 342 and metallic layer 348.

A surface 342a of base layer 342 can optionally be printed forming one or more print layers 352 as described above with respect to print layer 16 of FIG. 1. Print layer(s) 352 is thereby sandwiched between adhesive layer 350 and base layer 342, and is readable through transparent barrier layer 344.

When placed in a mold, an outer surface 342b of base layer 342 faces inwardly such that it is the inner-most layer in contact with the molten plastic shot material, while outer surface 346a of substrate layer 346 faces outwardly. The plastic shot bonds directly to base layer 342 during molding. In this embodiment, base layer 342 is of sufficient thickness to provide insulative properties to barrier layer 344 and print layer(s) 352 during molding such that the barrier properties of barrier layer 344 are not significantly compromised.

Furthermore, the construction of film 340 allows for sufficient overlap and sealing upon itself.

Figure 10:
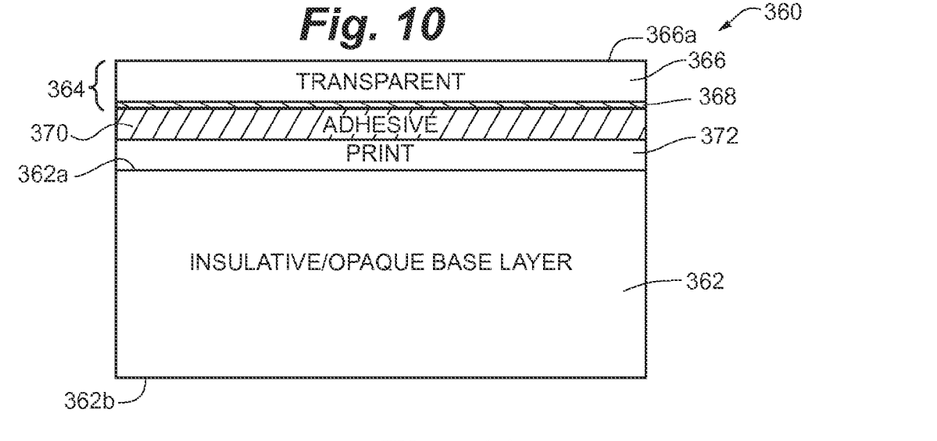
FIG. 10 is a cross-sectional view of an opaque barrier film construction including an aluminum oxide layer according to an embodiment of the invention for seal and peel in-mold label applications.

Referring to FIG. 10, an in-mold label for a peel and seal application is made from a composite film 360. Composite film 360 comprises a base layer 362 coupled to a barrier film 344. Base layer 362 comprises an opaque film material suitable for in-mold processing conditions such that it adheres readily to a plastic shot material used for molding of an article, as described with respect to base layer 12 of FIG. 1. Base layer 362 has a thickness from about 20 to about 200

μm and more particularly from about 90 to about 130 μm, and even more particularly about 120 μm. However, as described above the thickness of the label can be thinner or thicker than the exemplary, non-limiting range, depending on the final application or desired molded product. Suitable materials for base layer 362 can include, but are not limited to, lidding materials supplied by KWH Plast, Etimex or American Profol Inc.

Barrier film 364 includes a transparent substrate layer 366 and a metalized layer 368 deposited, such as by vapor deposition, on a surface of substrate layer 366. One such metalized barrier film comprises a transparent film of a polymeric material, such as, for example, polyethylene, PET or polypropylene including biaxially oriented polypropylene (BOPP), having a layer of aluminum oxide deposited thereon. Substrate layer 366 has a thickness from about 5 to about 40 μm, and more particularly from about 15 to about 25 μm. However, as described above the thickness of the label can be thinner or thicker than the exemplary, non-limiting range, depending on the final application or desired molded product.

Base layer 362 is coupled to barrier film 364 via an adhesive layer 370, as described above. Base layer 362 is coupled to barrier film 364 such that adhesive layer 370 is sandwiched between base layer 362 and metallic layer 368.

A surface 362a of base layer 362 can optionally be printed forming one or more print layers 372 as described above with respect to print layer 16 of FIG. 1. Print layer(s) 372 is thereby sandwiched between adhesive layer 370 and base layer 362, and is readable through transparent barrier layer 364.

When placed in a mold, an outer surface 362b of base layer 362 faces inwardly such that it is the inner-most layer in contact with the molten plastic shot material, while outer surface 366a of substrate layer 366 faces outwardly. The plastic shot bonds directly to base layer 362 during molding. In this embodiment, base layer 362 is of sufficient thickness to provide insulative properties to barrier layer 364 and print layer(s) 372 during molding such that the barrier properties of barrier layer 364 are not significantly compromised.

Furthermore, the construction of film 360 allows for sufficient overlap and sealing upon itself.

Figure 11:
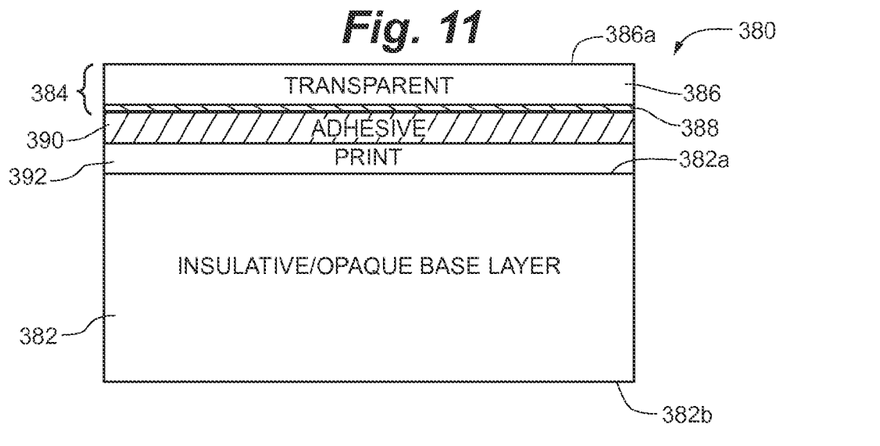
FIG. 11 is a cross-sectional view of an opaque barrier film construction including an silicon oxide ($SiO_x$) layer according to an embodiment of the invention for seal and peel in-mold label applications.

Referring to FIG. 11, an in-mold label for a peel and seal application is made from a composite film 380. Composite film 380 is a hybrid of film 340 and 360, and comprises a base layer 382 coupled to a barrier film 384. Base layer 382 comprises an opaque film material suitable for in-mold processing conditions such that it adheres readily to a plastic shot material used for molding of an article, as described with respect to base layer 12 of FIG. 1. Base layer 382 has a thickness from about 20 to about 200 μm and more particularly from about 90 to about 130 μm, and even more particularly about 120 μm. However, as described above the thickness of the label can be thinner or thicker than the exemplary, non-limiting range, depending on the final application or desired molded product. Suitable materials for base layer 382 can include, but are not limited to, lidding materials supplied by KWH Plast, Etimex or American Profol Inc.

Barrier film 384 includes a transparent substrate layer 386 and a metalized layer 388 deposited, such as by vapor deposition, on a surface of substrate layer 386. One such metalized barrier film is a transparent film of a polymeric material, such as, for example, polyethylene, PET or polypropylene including biaxially oriented polypropylene (BOPP), having a layer of silicon dioxide deposited thereon, as described with respect to FIG. 9. Substrate layer 386 has a thickness from about 5 to about 40 μm, and more particularly from about 15 to about 25 μm. However, as described above the thickness of the label can be thinner or thicker than the exemplary, non-limiting range, depending on the final application or desired molded product.

Base layer 382 is coupled to barrier film 384 via an adhesive layer 390, as described above. Base layer 382 is coupled to barrier film 384 such that adhesive layer 390 is sandwiched between base layer 382 and metallic layer 388.

A surface 382a of base layer 382 can optionally be printed forming one or more print layers 392 as described above with respect to print layer 16 of FIG. 1. Print layer(s) 392 is thereby sandwiched between adhesive layer 390 and base layer 382, and is readable through transparent barrier layer 384.

When placed in a mold, an outer surface 382b of base layer 382 faces inwardly such that it is the inner-most layer in contact with the molten plastic shot material, while outer surface 386a of substrate layer 386 faces outwardly. The plastic shot bonds directly to base layer 382 during molding. In this embodiment, base layer 382 is of sufficient thickness to provide insulative properties to barrier layer 384 and print layer(s) 392 during molding such that the barrier properties of barrier layer 384 are not significantly compromised.

Furthermore, the construction of film 380 allows for sufficient overlap and sealing upon itself.

Figure 12:
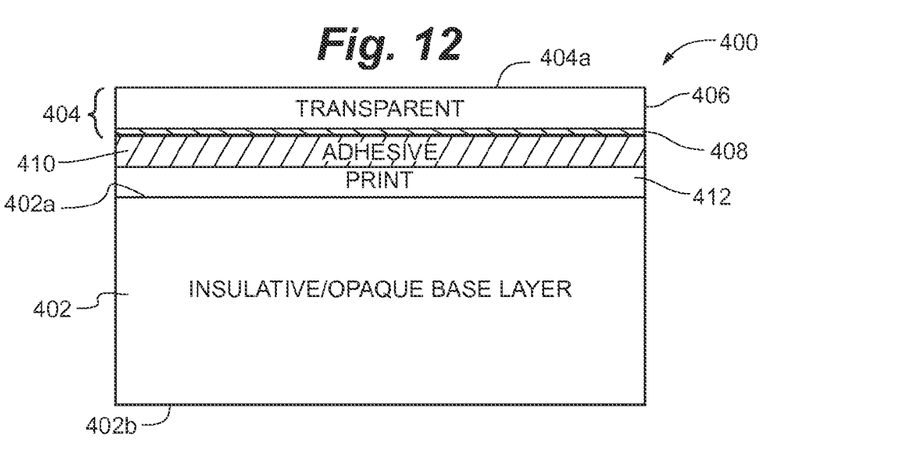
FIG. 12 is a cross-sectional view of an opaque barrier film construction including an barrier layer according to an embodiment of the invention for seal and peel in-mold label applications.

Referring to FIG. 12, an in-mold label for a peel and seal application is made from a composite film 400. Composite film 400 comprises a base layer 402 coupled to a barrier film 404. Base layer 402 comprises an opaque film material suitable for in-mold processing conditions such that it adheres readily to a plastic shot material used for molding of an article, as described with respect to base layer 12 of FIG. 1. Base layer 402 has a thickness from about 20 to about 200 μm and more particularly from about 90 to about 130 μm, and even more particularly about 120 μm. However, as described above the thickness of the label can be thinner or thicker than the exemplary, non-limiting range, depending on the final application or desired molded product. Suitable materials for base layer 402 can include, but are not limited to, lidding materials supplied by KWH Plast, Etimex or American Profol Inc.

Barrier film 404 comprises a transparent barrier substrate 406 having a barrier layer 408 buried within. Suitable barrier films can include, for example, a chlorine-free, transparent, high oxygen and high water vapor barrier, such as a biaxially oriented polypropylene film with a sealant layer on one side, as described in FIG. 1. One such barrier film is available from AET Films and as described at Film 5 of Table 1 below. Barrier film 404 has a thickness from about 5 to about 40 μm, and more particularly from about 20 to about 30 μm, and even more particularly about 22 μm. However, as described above the thickness of the label can be thinner or thicker than the exemplary, non-limiting range, depending on the final application or desired molded product.

Base layer 402 is coupled to barrier film 404 via an adhesive layer 410, as described above. Base layer 402 is coupled to barrier film 404 such that adhesive layer 410 is sandwiched between base layer 402 and barrier layer 408.

A surface 402a of base layer 402 can optionally be printed forming one or more print layers 412 as described above with respect to print layer 16 of FIG. 1. Print layer(s) 412 is thereby sandwiched between adhesive layer 410 and base layer 402, and is readable through transparent barrier layer 404.

When placed in a mold, an outer surface 402b of base layer 402 faces inwardly such that it is the inner-most layer in contact with the molten plastic shot material, while outer surface 406a of substrate layer 406 faces outwardly. The plastic shot bonds directly to base layer 402 during molding. In this embodiment, base layer 402 is of sufficient thickness to provide insulative properties to barrier layer 404 and print layer(s) 412 during molding such that the barrier properties of barrier layer 404 are not significantly compromised.

Furthermore, the construction of film 400 allows for sufficient overlap and sealing upon itself.

One of ordinary skill in the art would recognize that the constructions of FIGS. 1-12 are exemplary only, and can the materials and films can be modified and combined based on the desired properties of the final product or container into which the composite films will be incorporated, which will be demonstrated in the Examples below. It is also recognized that alternatively to or in addition to lamination techniques, co-extrusion of the different layers of the films, such that an adhesive layer may be omitted can also be contemplated.

Table 1 below lists barrier proprieties of commercially available film materials for use as barrier layers in embodiments of the present invention, compared to baseline materials having an EVOH layer. Film 1 is an EVOH film used in films having barrier properties as described in the Background section; Film 2 is a commercially available film of the prior art incorporating Film 1; Film 3 is also a commercially available film of the prior art incorporating Film 1; Films 4-6 are a commercially available barrier films suitable for use in the embodiments described above.

Figure 13:
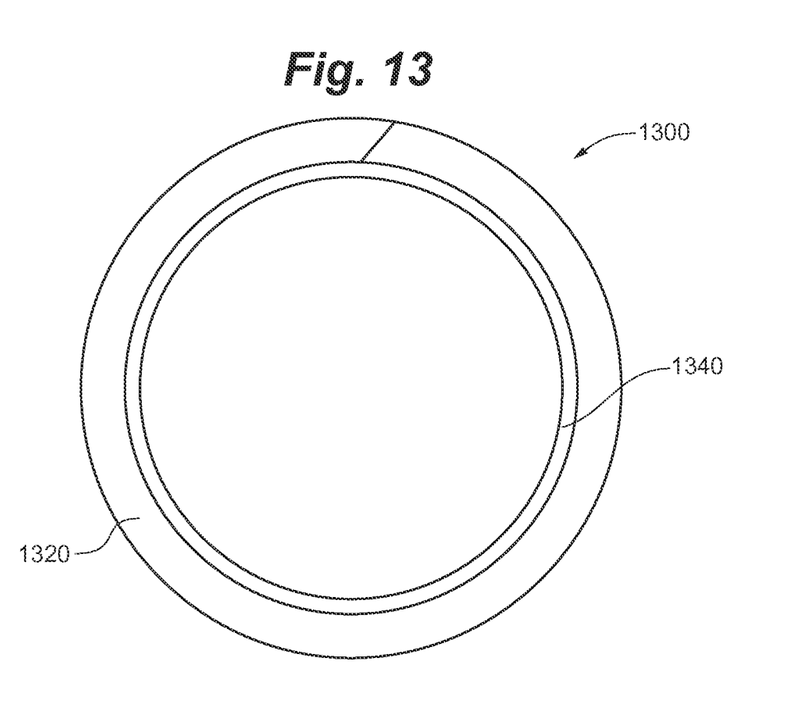
FIG. 13 is a cross-sectional view of a molded article having an in-mold label with barrier properties molded within.

Referring to FIG. 13, a molded article incorporating a composite film according to embodiments of the invention is shown at 1300. Molded article 1300 includes a plastic base 1320 formed from the plastic shot material, and an in-mold label 1340 formed from any of the composite film discussed supra.

Figure 14:
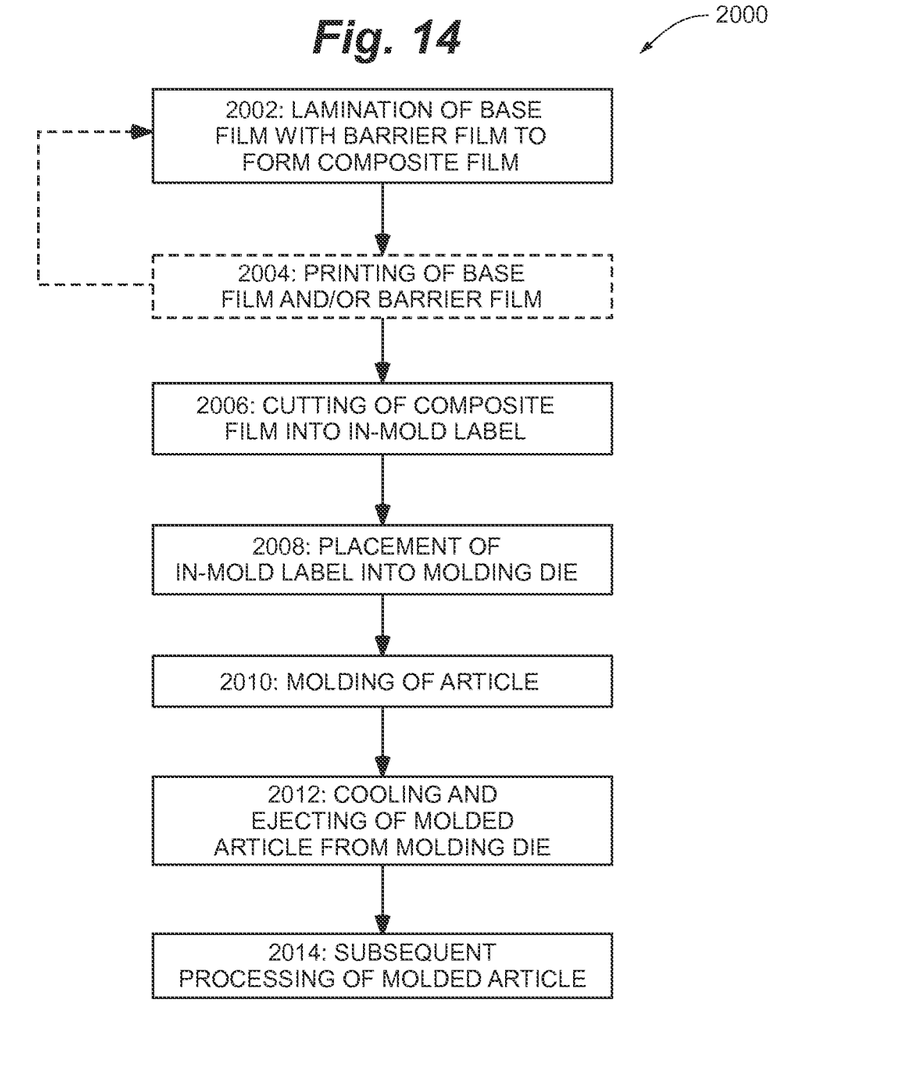
FIG. 14 is a flow diagram of a method for molding an article having an in-mold label with barrier properties.

FIG. 14 is a flow diagram showing method 2000 for producing a molded article having an in-mold label with barrier properties. At 2002, a composite film is created by lamination of web of base layer material with a web of barrier layer material, as described in FIGS. 1-6. Lamination can be accomplished using a nip roller, belt laminator, or any suitable lamination technique. Alternatively, co-extrusion of one or more layers of the composite films can be used in lieu of or in combination with lamination. When co-extrusion of one or more layers is used, one or more of the adhesive layers above may be eliminated. Furthermore, the use of a continuous web of film for each layer is described; however, one of ordinary skill in the art would recognize that individual sheets can also be utilized.

At 2004, if a print layer is desired, a surface of the base layer and/or surface of the barrier layer depending on the desired film construction. If it is desired that the print layer is sandwiched between base and barrier layers, then the appropriate film is printed before lamination. If an outer surface of either the barrier or base film is to be printed, then the appropriate film is printed before and/or after lamination.

TABLE 1

Barrier film properties of various films

| Film ID | Oxygen Barrier | Vapor Barrier | Oxygen Barrier with Retort Properties | Oxygen with Retort and Peelable Properties | Light Barrier | Aroma/Flavor Barrier | Comments |
| --- | --- | --- | --- | --- | --- | --- | --- |
| 1 - EVOH layer | 0.006-0.12 cc/100 in$^2$ per day | | Poor | Poor | Poor | N/A | Crystallinity and thickness increases barrier; temperature and humidity decrease oxygen barrier. |
| 2 - EVOH film | 0.8 cc/m$^2$ per day | Good | Fair | N/A | TBD | TBD | EVOH films acceptable for food packaging. Mono-web 90 micron layered film (high barrier); transparent or opaque |
| 3 - EVOH film | 2 cc/m$^2$ per day | Good | Fair | N/A | TBD | TBD | EVOH film mono-web 80 micron (medium barrier) white or transparent |
| 4 - PP film | 0.35 cc/m$^2$ per day @23 C., 50% RH | N/A | TBD | Poor | Good | TBD | 82 micron white polypropylene cast film |
| 5 - PP film | 0.17 cc/100 in$^2$ per day | 0.18 g/100 in$^2$ per day | TBD | N/A | Poor | Good | Transparent 88 gauge oriented polypropylene; Chlorine fee, transparent, high oxygen and high water vapor barrier, biaxially oriented polypropylene; scalable on one side, printbable high barrier functional surface. Yield (in$^2$/lb) 32,700 Basis weight (g/m$^2$) 13.2 |
| 6 - metalized PP film | 0.0041 cc/100 in$^2$ per day (75 gauge) | 0.10 g/100 in$^2$ per day (75 gauge) | TBD | N/A | Good | N/A | Ultra high barrier film, metalized coextruded, solid core white, biaxially oriented polypropylene film; scalable one side via sealant layer, and metalized on other side; available from 55-155 gauge Gauge 75; Yield (in$^2$/lb) 40,500 Basis weight (g/m$^2$) 17.4 |

At 2006, the laminated composited film is then converted or cut to the desired in-mold label dimensions to form a plurality of in-mold labels. At 2008, an in-mold label is then placed via hand or robotics into a mold cavity of a mold portion of a molding tool. In one embodiment, the in-mold label overlaps itself to seal upon itself as well as the plastic shot material. Alternatively, a butt splice or other splices can be used, or no splice is used such that opposing ends of the label do not touch or are not proximate one another depending on the geometric application of the label. One type of an injection molding assembly is described for exemplary purposes only, but other injection molding devices may also be used. The mold cavity of the molding tool is specifically configured to accommodate the in-mold label. The in-mold label is placed in the mold cavity so that the desired surface of the label is exposed to the molten plastic in the mold cavity during the subsequent molding step 2010.

At 2010, the container or article is molded. In one embodiment, the molding step 208 is completed by plastic injection molding processes. In this case, the injection molding tool in a single-stage reciprocating screw type which tends to thoroughly prepare material for injection and often are faster, but other injection molding tools may be utilized such as a conventional single-stage plunger type or a two-stage plunger or screw-plasticizer type. During operation a raw plastic (i.e., the material shot of thermoplastic material) is fed into a material hopper where it contacts an injector screw. As the screw is turned by a screw drive motor, a screw is pushed backward and the material shot is forced into a chamber of a heating cylinder. When enough material to fill the mold cavity has been prepared (i.e., heated to between 300 and 700° F. depending on the type of plastic), the screw drive motor is shut off to stop turning the screw. A pull-in cylinder is operated to move the screw on a slide to ram the material shot through an inlet nozzle into the mold cavity of the mold.

The plastic liquid resin is injected into the mold cavity defined by the passages between and within the mold top, the mold body, and a center die. The plastic is injected under high heat and pressure (5000 to 50,000 psi) and contacts the exposed portions of the label. The exposed and heated portion of the label remains a liquid for a very brief time and then re-solidifies in the mold as the entire container cools in step 2010. This process creates an almost instant and substantially permanent bond at an interface between the in-mold label and the plastic shot material of the container.

At 2012, the injected material in the mold is allowed to cool within until it has hardened adequately. At this point, the hardened and formed container with an integrally bonded label having barrier properties is ejected by an ejector positioned in the mold body, and the container fabrication process 2000 is ended. Additional information regarding molding using an in-mold label or insert having a lens sheet is described in U.S. Pat. No. 7,153,555, entitled "Plastic Objects Including Lenticular Lens Sheets," incorporated herein by reference in its entirety.

At 2014, the article or container can then be filled with the desired material, such as a food product, pet product, medicine product, or industrial product, to be packaged. Subsequent processing, such as sterilization processing including retort processing, can then be performed on the container with in-mold label without significant reduction, degradation or compromise of the barrier properties.

EXAMPLES

Embodiments are further depicted and described in the following examples. A number of composite films were constructed, and some of which are molded into containers using standard injection molding techniques.

Sample 1:
Sample 1 film is a composite film including a cavitated opaque film comprising highly voided oriented polypropylene (OPP), and having a gauge of 50 microns, having a print layer on an outer surface, and laminated, via laminating adhesive, to a barrier layer made up of an opaque biaxially oriented polypropylene layer metalized on one side. The metalized layer is adjacent the adhesive layer such that it is buried within the composite film. The non-metalized side of the polypropylene film is the bonding side for molding applications. The Sample 1 film is sealable onto itself such that an overlap seam is possible.

Sample 2:
Sample 2 is similar to the opaque/metallic barrier layer construction of Sample 1, and is sealable onto itself such that n overlap seam is possible.

Sample 3:
Sample 3 is a composite film including an opaque cavitated film comprising highly voided OPP, and having a gauge of 57 microns, and laminated, via laminating adhesive, to a transparent film barrier film having a barrier layer on an inner side of the barrier film. The base material is printed on a side proximate the adhesive so that the print layer is buried within the composite film, yet viewable through the barrier film. The unprinted side of the base material is the bonding side for molding applications.

Sample 4:
Sample 4 is a composite film of a transparent barrier film having a metalized side laminated, via a laminating adhesive, to a cavitated, opaque base film comprising highly voided OPP, and having a gauge of 50 microns as described in Sample 1. The metalized layer is adjacent the adhesive layer to bury the metalized layer within the composite film. A non-laminated side of the base layer is printed. The unmetalized layer of the barrier film is the bonding side for molding applications.

Sample 5:
Sample 5 is a composite film of a transparent barrier film having a metalized side laminated to a cavitated, opaque base film comprising highly voided OPP, and having a gauge of 50 (same base film as Sample 1) via a laminating adhesive. The metalized layer is adjacent the adhesive layer to bury the metalized layer within the composite film. A non-laminated side of the base layer is printed. The unmetalized layer of the barrier film is the bonding side for molding applications.

Sample 6:
Sample 6 is a composite film of a retort film (i.e. film sufficient to withstand retort processes) laminated to a transparent cavitated base film comprising highly voided OPP, an having a gauge 57 microns, via a laminating adhesive. A side of the base film is printed, and adjacent to the adhesive layer to bury the print layer within the film. The unprinted side of the base layer is the bonding side for molding applications.

Sample 7:
Sample 7 is a composite film of a transparent barrier film of about gauge 88 microns laminated to an opaque cavitated base film comprising highly voided OPP, and having a gauge of 57 microns via a laminating adhesive. A side of the base film is printed, and adjacent to the adhesive layer to bury the print layer within the film. The unprinted side of the base layer is the bonding side for molding applications.

Sample 8:

Sample 8 is a composite film of a transparent barrier film of about gauge 88 laminated to a transparent cavitated film comprising highly voided OPP, and having a of gauge 57 microns, via a laminating adhesive. A side of the base film is printed, and adjacent to the adhesive layer to bury the print layer within the film. The unprinted side of the base layer is the bonding side for molding applications.

Sample 9:

Sample 9 is a composite film of a cavitated, opaque base film comprising highly voided OPP, and having a gauge of 50 microns, laminated to a barrier film having a gauge of 88 via a laminating adhesive. The unlaminated side of the base film is printed. The unlaminated side of the barrier layer is the bonding side for molding applications. The Sample 9 label is sealable onto itself such that an overlap seal is possible.

Sample 10:

Sample 10 is a composite film of a cavitated, opaque base film comprising highly voided OPP, and having a gauge of 50 microns, via a laminating adhesive, to a barrier film having an opaque substrate layer and a metalized layer. The unlaminated side of the base film is printed. The metalized side of the barrier film is adjacent the adhesive layer so that the metalized layer is buried within the composite film. The unmetalized side of the barrier layer is the bonding side for molding applications. The Sample 10 label is sealable onto itself such that an overlap seal is possible.

Properties of each sample film are summarized in Table 2 below:

TABLE 2

Film Properties

| Sample Number | Label Characteristics | Retortable | Print Location | Barrier Properties$_{(1)}$ OTR | VTR | Overall Film Thickness (u) |
|---|---|---|---|---|---|---|
| Lab Sample #1 | Opaque/Metallic/Overlap | Yes | Top | $0.008_{(2)}$ | $0.010_{(3)}$ | 109.6 |
| Lab Sample #2 | Opaque/Metallic/Overlap | Yes | Top | $0.008_{(2)}$ | $0.010_{(3)}$ | 107.1 |
| Lab Sample #3 | Transparent/No Overlap | Yes | Sandwiched | $0.170_{(2)}$ | $0.180_{(3)}$ | 115.5 |
| Lab Sample #4 | Transparent/Metallic/Overlap TBD | Yes | Top | $0.60_{(2)}$ | $0.008_{(2)}$ | 104.5 |
| Lab Sample #5 | Transparent/Metallic/Overlap TBD | Yes | Top | $0.170_{(2)}$ | $0.180_{(3)}$ | 105.8 |
| Lab Sample #6 | Opaque/No Overlap | Yes | Sandwiched | $0.0196_{(2)}$ | $3.22_{(3)}$ | 70.2 |
| Lab Sample #7 | Opaque/No Overlap | Yes | Sandwiched | $0.011_{(2)}$ | $0.067_{(3)}$ | 80.2 |
| Lab Sample #8 | Transparent/No Overlap | Yes | Sandwiched | $0.011_{(2)}$ | $0.067_{(3)}$ | 80.2 |
| Lab Sample #9 | Opaque/Overlap | Yes | Top | $0.011_{(2)}$ | $0.067_{(3)}$ | 73.2 |
| Lab Sample #10 | Opaque/Metallic/Overlap | Yes | Top | $93.0_{(2)}$ | $0.16_{(3)}$ | 69.0 |

Notes:
$_{(1)}$Barrier Rates are published values.
$_{(2)}$OTR: cc/100 in2/24 hr@73° F., 0% RH
$_{(3)}$VTR: g/100 in2/24 hr@100° F., 90% RH Films from samples 1 and 9 were then used in molding sample containers. The oxygen barrier and water vapor barrier for the container was tested to determine whether the barrier properties of the films are compromised during molding processes, shown in Table 3 below.

TABLE 3

Molded Container Properties

| Container Number | Part Size | Label Formulation Sample(s) | Surface Area In$^2$ | Barrier Properties$_{(1)}$ OTR (Cont) cc/pack/day* | OTR (Area) cc/m$^2$/day* | Barrier Properties$_{(1)}$ WVTR (Cont) g/pack/day* | WVTR (Area) g/m$^2$/day* |
|---|---|---|---|---|---|---|---|
| Container #1 | 6.0 oz | No IML | 36.0 | >2.0 | 86.1100 | 1.60E−03 | 0.0689 |
| Container #2 | 6.0 oz | Sample #1 | 36.0 | 1.25E−02 | 0.5382 | 4.50E−04 | 0.0194 |
| Container #3 | 6.0 oz | Samples #1 w/#9 Bottom | 36.0 | 9.00E−02 | 3.8753 | 7.00E−04 | 0.0301 |
| Container #4 | 6.0 oz | Sample #9 | 36.0 | 1.20E−01 | 5.1670 | 1.30E−03 | 0.0560 |

Notes:
*Test Conditions at 23° C. and 80% RH

By the various combinations of composite films as described above, one can tailor a composite film based on the desired properties for a final molded product. Such properties include various barrier properties such as oxygen, water vapor, sunlight, UV light, odor, flavor, importance of print quality, film gauge, and the like. Any of a variety of composite films can be contemplated. In an embodiment, the composite film exhibits a moisture or water vapor barrier defined as a Water Vapor Transmission Rate (WVTR) of 3.0 g/100 in$^2$ per 24 hours at 100° F./90% RH or less. In another embodiment, the composite film exhibits an oxygen barrier defined as an Oxygen Transmission Rate (O2TR) of 10.0 cc/m$^2$ per 24 hours at 73° F./0% RH or less. In another embodiment, the composite film exhibits a Water Vapor Transmission Rate (WVTR) of 0.010 g/100 in$^2$/day at 84.4° F./80% RH, an Oxygen Transmission Rate (O2TR) of 0.0041 cc/100 in$^2$/day at 73° F./0% RH, or both.

In alternative embodiments (not shown), in addition to or as an alternative to one or more barrier layers or films of the composite film, the composite films comprise a reflective layer such that the composite film has reflective properties. When such composite film is used as an in-mold label when molding an article, the final molded article similarly has reflective properties on exterior and/or interior surfaces of the article.

In one embodiment of the invention, a reflective composite film comprises a base film, and a reflective film coupled thereto. The reflective film can comprise a carrier film and a reflective material, such as a metallic material (e.g. gold, silver, aluminum, etc.) vacuum or vapor deposited, laminated, coated, printed, or otherwise applied thereon, forming a reflective layer on the base film. The reflective layer can cover all or portions of the carrier film as desired. Suitable films can include reflective films available from 3M Company, such as those commercially available as 3M™ Scotchlite™ Removable Reflective Graphic Films, in various colors and gauges, and optionally comprising a microreplicated surface of micro features to enhance reflectivity. Alternatively, the reflective film comprises reflective particles, such as metallic or foil materials, distributed throughout the carrier film. The reflective films can have a thickness for example, from about 5 microns or less to about 10 mils (about 25.4 µm to about 254 µm).

In this embodiment, the base film can comprise, for example, an opaque or transparent, and optionally cavitated, film material suitable for in-mold processing conditions such that it adheres readily to a plastic shot material used for molding of an article, such as those described supra. The base film can comprise, for example, a polypropylene or polyethylene film. The base film has a thickness from about 20 to about 75 µm and more particularly from about 40 to about 65 µm; however, as described above the thickness of the label can be thinner or thicker than the exemplary, non-limiting range, depending on the final application or desired molded product.

The reflective film having a reflective material thereon or therein can cover an entire surface of the base film, or only portions thereof. The reflective film can be applied to form graphics or text, and/or can form a continuous layer. Upon placement into the mold, the base layer is in contact to and bonds with the plastic shot material to form a molded article having the reflective layer bonded thereto.

The base film is coupled to the reflective film via an adhesive layer. The adhesive layer can comprise any of a number of suitable adhesives as described above with respect to FIG. 1. Alternatively, the base film and reflective film are coextruded to form the composite reflective film.

Optionally, an outer surface or reflective layer can be printed on the base film (or carrier film) forming one or more print layers as described above with respect to print layer 16 of FIG. 1.

In some embodiments, a reflective layer of the reflective film comprises one or more barrier properties as described infra such that the reflective film serves a second function as a barrier film.

When placed in a mold, the base layer faces inwardly such that it is the inner-most layer in contact with the molten plastic shot material. The plastic shot bonds directly to the base layer.

Alternatively, the base layer can be printed with a reflective ink, rather than a separate reflective layer, and can optionally comprise a transparent protective film or coating over the reflective ink.

Articles having reflective properties can be formed using the in-mold label having the reflective layer. Such articles can comprise any of a variety of articles in which reflective properties are desired. Such articles can include, but are not limited to, signage such as road or construction signage, construction cones, garbage can, recycling bins, mailboxes, recreational helmets such as bicycle, motorcycle, or skateboarding helmets, sport helmets such as football or batting helmets, lawn mower parts such as start steps and platforms, ladders, any of a variety of molded parts for automobiles, recreational vehicles, boats, buoys, floats, and the like, water bottles, flashlights, or essentially any form of molded part that is desired to have reflective properties.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

For purposes of interpreting the claims for the present invention, it is expressly intended that the provisions of 35 U.S.C. § 112, six paragraph, are not to be invoked unless the specific terms "means for" or "step for" are recited in a claim.

What is claimed is:

1. A laminated composite film assembly for use as in-mold labels in molded articles, the composite film assembly comprising:
 a base film having an outermost surface formed of a first composition defining a first outermost facing surface of the laminated composite film assembly; and
 a chlorine-free barrier film assembly comprising a substrate having a transparent or translucent alumina layer deposited thereon, wherein the barrier film assembly is laminated to the base film via at least one laminating adhesive layer such that the alumina layer is positioned between the substrate and the base film,
 wherein the chlorine-free barrier film assembly further comprises a print layer deposited on the substrate opposite the base film, wherein the chlorine-free barrier film assembly has an outermost surface formed of a second composition defining a second outermost facing surface of the laminated composite film assembly, wherein the second composition is different than the first composition, wherein the two outermost facing surfaces of the composite film assembly are directly sealable to each other, and wherein the composite film assembly imparts an oxygen barrier property, a water vapor barrier property, or combinations thereof.

2. The composite film assembly of claim 1, wherein the composite film assembly provides a water vapor barrier property defined as a Water Vapor Transmission Rate (WVTR) of 3.0 g/100 in$^2$ per 24 hours at 100° F./90% RH or less.

3. The composite film assembly of claim 1, wherein the composite film assembly provides an oxygen barrier property defined as an Oxygen Transmission Rate (O2TR) of 10.0 cc/m$^2$ per 24 hours at 73° F./0% RH or less.

4. The composite film assembly of claim 1, wherein the base film comprises a cavitated film.

5. The composite film assembly of claim 1, wherein the substrate comprises an oriented film.

6. The composite film assembly of claim 1, wherein the transparent or translucent alumina layer comprises alumina doped with oxygen.

7. The composite film assembly of claim 1, wherein the substrate of the barrier film assembly comprises a biaxially oriented polypropylene film.

8. An in-mold label for molded articles, the in-mold label formed from the composite film of claim 1.

9. A laminated composite web or sheet formed from the composite film assembly of claim 1, the laminated composite web or sheet having a plurality of in-mold labels removable therefrom.

10. A molded article including an in-mold label having barrier properties, the molded article comprising:
   a first in-mold label formed from the composite film assembly of claim 1; and
   a molded plastic base, wherein the first outermost surfaces of the first in-mold label is thermally fused to the plastic base,
   wherein the composite film provides an oxygen barrier property, a water vapor barrier property, or combinations thereof to the molded article.

11. The article of claim 10, wherein the base film of the composite film assembly forming the first in-mold label comprises a cavitated film.

12. The article of claim 10, wherein the base film of the composite film assembly forming the first in-mold label is fused to the plastic base, and wherein the base film insulates the barrier film assembly of the composite film assembly forming the first in-mold label such that the barrier properties are not significantly changed after molding.

13. The laminated composite film assembly of claim 1, wherein the chlorine-free barrier film assembly further includes an insulator layer disposed between the substrate and the print layer, and wherein the insulator layer insulates the chlorine-free barrier film assembly such that the barrier properties are not significantly changed after molding.

14. The composite film of claim 1, wherein the base film comprises a solid opaque core film.

* * * * *

UNITED STATES PATENT AND TRADEMARK OFFICE
CERTIFICATE OF CORRECTION

PATENT NO. : 10,286,628 B2  
APPLICATION NO. : 13/834035  
DATED : May 14, 2019  
INVENTOR(S) : Lee A. Timmerman et al.

Page 1 of 1

It is certified that error appears in the above-identified patent and that said Letters Patent is hereby corrected as shown below:

In the Specification

In Column 11, Line 46, delete "describe" and insert -- described --, therefor.

In Column 12, Line 5, delete "describe" and insert -- described --, therefor.

Signed and Sealed this
Nineteenth Day of May, 2020

Andrei Iancu
*Director of the United States Patent and Trademark Office*